(12) United States Patent
Yamaguchi

(10) Patent No.: US 11,820,009 B2
(45) Date of Patent: Nov. 21, 2023

(54) ROBOT SYSTEM

(71) Applicant: SEIKO EPSON CORPORATION, Tokyo (JP)

(72) Inventor: Koki Yamaguchi, Kamiina-Gun Minowa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 19 days.

(21) Appl. No.: 17/666,600

(22) Filed: Feb. 8, 2022

(65) Prior Publication Data

US 2022/0250238 A1 Aug. 11, 2022

(30) Foreign Application Priority Data

Feb. 10, 2021 (JP) .................. 2021-019546

(51) Int. Cl.
*B25J 9/00* (2006.01)
*B25J 9/16* (2006.01)

(52) U.S. Cl.
CPC ........... *B25J 9/0084* (2013.01); *B25J 9/0009* (2013.01); *B25J 9/1664* (2013.01)

(58) Field of Classification Search
CPC ....... B25J 9/0084; B25J 9/0009; B25J 9/1664
See application file for complete search history.

(56) References Cited

U.S. PATENT DOCUMENTS

| 4,737,697 A * | 4/1988 | Maruo | B25J 9/107 |
| | | | 318/568.14 |
| 2003/0192758 A1 * | 10/2003 | Murata | B25J 9/1674 |
| | | | 188/382 |
| 2009/0069943 A1 * | 3/2009 | Akashi | B25J 9/1676 |
| | | | 901/3 |
| 2015/0352720 A1 * | 12/2015 | Lizuka | B25J 9/1664 |
| | | | 414/730 |
| 2017/0057089 A1 | 3/2017 | Tsuda et al. | |
| 2018/0071913 A1 * | 3/2018 | Matsudaira | B25J 9/161 |

(Continued)

FOREIGN PATENT DOCUMENTS

CN 106476009 A 3/2017
CN 107414817 A 12/2017
(Continued)

OTHER PUBLICATIONS

Search Report of the First Office Action CN Application No. 2022101164431 dated Apr. 28, 2023.

*Primary Examiner* — Kira Nguyen
(74) *Attorney, Agent, or Firm* — Yu Gang

(57) ABSTRACT

A robot system includes: a plurality of robot arms having a motor; a plurality of controllers controlling the robot arms; and a teaching device designating the controller and transmitting an instruction signal thereto. The controller includes: a control unit controlling an operation of the robot arm; a motor operation control unit controlling whether to operate the motor or not; a first connector and a second connector for coupling a wiring electrically coupling to the teaching device; and a first enable valid/invalid switch setting whether to operate the motor or not. The motor operation control unit controls the operation of the motor, based on the setting by the first enable valid/valid switch about whether to operate the motor or not, regardless of the instruction signal.

4 Claims, 9 Drawing Sheets

(56) References Cited

U.S. PATENT DOCUMENTS

2018/0281172 A1   10/2018  Inaba et al.
2019/0121335 A1*  4/2019  Yoneda ................ G05B 19/425

FOREIGN PATENT DOCUMENTS

| CN | 108687746 A | 10/2018 |
|---|---|---|
| JP | H05204439 A | 8/1993 |
| JP | 2016221644 A | 12/2016 |

* cited by examiner

FIG. 5

| ENABLE SWITCH | ENABLE VALID/INVALID SWITCH | OPERATION STATE OF ROBOT ARM |
|---|---|---|
| VALID | INVALID | NOT SELECTED AND THEREFORE NOT OPERATE |
| INVALID | INVALID | NOT SELECTED AND THEREFORE NOT OPERATE |
| VALID | VALID | OPERABLE |
| INVALID | VALID | NOT ENABLED AND THEREFORE NOT OPERATE |

FIG. 6

| ENABLE SWITCH | ENABLE VALID/INVALID SWITCH OF CONTROLLER | | | OPERATION STATE OF ROBOT ARM | | |
|---|---|---|---|---|---|---|
| | FIRST | SECOND | THIRD | FIRST | SECOND | THIRD |
| VALID | VALID | VALID | VALID | OPERABLE | OPERABLE | OPERABLE |
| VALID | VALID | VALID | INVALID | OPERABLE | OPERABLE | NOT OPERATE |
| VALID | VALID | INVALID | VALID | OPERABLE | NOT OPERATE | OPERABLE |
| VALID | VALID | INVALID | INVALID | OPERABLE | NOT OPERATE | NOT OPERATE |
| VALID | INVALID | VALID | VALID | NOT OPERATE | OPERABLE | OPERABLE |
| VALID | INVALID | VALID | INVALID | NOT OPERATE | OPERABLE | NOT OPERATE |
| VALID | INVALID | INVALID | VALID | NOT OPERATE | NOT OPERATE | OPERABLE |
| VALID | INVALID | INVALID | INVALID | NOT OPERATE | NOT OPERATE | NOT OPERATE |
| INVALID | VALID | VALID | VALID | NOT OPERATE | NOT OPERATE | NOT OPERATE |
| INVALID | VALID | VALID | INVALID | NOT OPERATE | NOT OPERATE | NOT OPERATE |
| INVALID | VALID | INVALID | VALID | NOT OPERATE | NOT OPERATE | NOT OPERATE |
| INVALID | VALID | INVALID | INVALID | NOT OPERATE | NOT OPERATE | NOT OPERATE |
| INVALID | INVALID | VALID | VALID | NOT OPERATE | NOT OPERATE | NOT OPERATE |
| INVALID | INVALID | VALID | INVALID | NOT OPERATE | NOT OPERATE | NOT OPERATE |
| INVALID | INVALID | INVALID | VALID | NOT OPERATE | NOT OPERATE | NOT OPERATE |
| INVALID | INVALID | INVALID | INVALID | NOT OPERATE | NOT OPERATE | NOT OPERATE |

ROBOT SYSTEM

The present application is based on, and claims priority from JP Application Serial Number 2021-019546, filed Feb. 10, 2021, the disclosure of which is hereby incorporated by reference herein in its entirety.

BACKGROUND

1. Technical Field

The present disclosure relates to a robot system.

2. Related Art

At many plants, a plurality of robots operate in order to improve production efficiency. To operate each robot, an operator operates a pendant as a teaching device and thus designates an operation of the robot as a robot arm. JP-A-5-204439 discloses a robot system having a plurality of robots and a pendant. In this robot system, a robot controller is electrically coupled to each robot. The robot controller controls the robot. The plurality of robot controllers are electrically coupled to an upper-level controller.

The upper-level controller has a plurality of connectors corresponding to the individual robots. The individual connectors correspond to the individual robots. For example, ten connectors, that is, first to tenth connectors, are installed in the upper-level controller, corresponding to ten robots, that is, first to tenth robots. To designate an operation of the first robot, a connector of the pendant and the first connector are electrically coupled together. To designate an operation of the second robot, the connector of the pendant and the second connector are electrically coupled together. The robot to be operated is designated by coupling the connector of the pendant to the connector corresponding to the robot whose operation is designated.

The configuration described in JP-A-5-204439 has a problem in that a robot that is not an operation target may be actuated when the connector of the pendant and the connector of the robot that is not an operation target are coupled together by mistake or when the upper-level controller has a failure.

SUMMARY

A robot system includes: a plurality of robot arms having a motor; a plurality of controllers controlling the robot arms; and a teaching device designating the controller and transmitting an instruction signal thereto. The controller includes: a control unit controlling an operation of the robot arm; a motor operation control unit controlling whether to operate the motor or not; a connector for coupling a wiring electrically coupling to the teaching device; and a switch unit setting whether to operate the motor or not. The motor operation control unit controls the operation of the motor, based on the setting by the switch unit about whether to operate the motor or not, regardless of the instruction signal.

BRIEF DESCRIPTION OF THE DRAWINGS

FIG. 5 explains the relationship between an enable switch and an enable valid/invalid switch, and an operation state of a robot arm.

FIG. 6 explains the relationship between the enable switch and the enable valid/invalid switch, and the operation state of the robot arm.

DESCRIPTION OF EXEMPLARY EMBODIMENTS

First Embodiment

Figure 1:
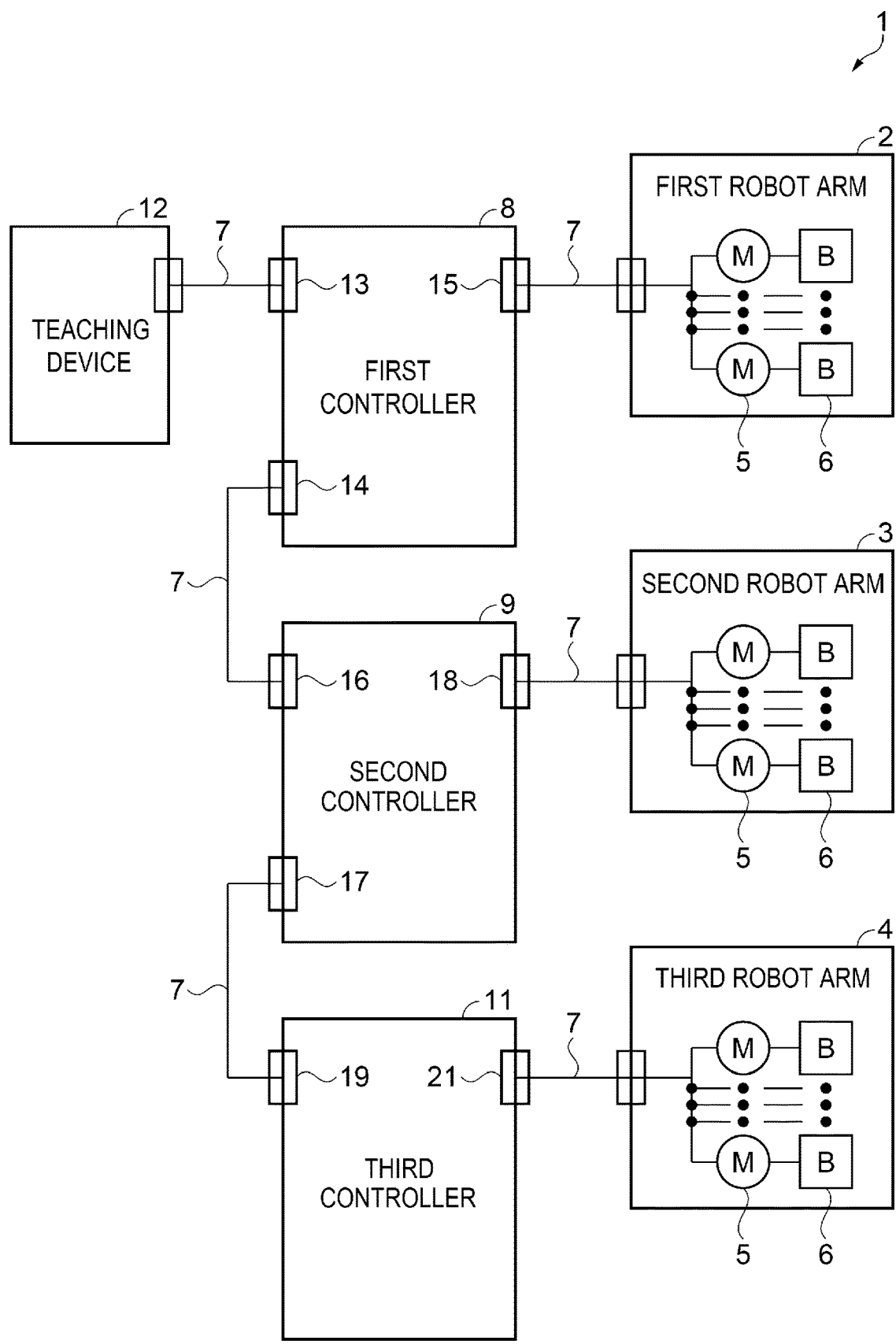
FIG. 1 is a block diagram showing the configuration of a robot system according to a first embodiment.

In this embodiment, a characteristic example of a robot system is described with reference to the drawings. As shown in FIG. 1, a robot system 1 has a first robot arm 2 as a robot arm, a second robot arm 3 as a robot arm, and a third robot arm 4 as a robot arm. The robot system 1 has a plurality of robot arms. The number of robot arms is not limited.

The first to third robot arms 2 to 4 have a plurality of motors 5. Each motor 5 is provided with a brake 6. When no current flows through the motor 5, the brake 6 operates and therefore the first robot arm 2 maintains a predetermined attitude. The second robot arm 3 and the third robot arm 4 have the same structure as the first robot arm 2.

The robot system 1 has a plurality of controllers controlling the robot arms. The first robot arm 2 is electrically coupled to a first controller 8 as a controller via a wiring 7. The first controller 8 controls the first robot arm 2. The second robot arm 3 is electrically coupled to a second controller 9 as a controller via a wiring 7. The second controller 9 controls the second robot arm 3. The third robot arm 4 is electrically coupled to a third controller 11 as a controller via a wiring 7. The third controller 11 controls the third robot arm 4.

The robot system 1 has a teaching device 12 designating a controller and transmitting an instruction signal thereto. The teaching device 12 and the first controller 8 are electrically coupled together via a wiring 7. The first controller 8 and the second controller 9 are electrically coupled together via a wiring 7. The second controller 9 and the third controller 11 are electrically coupled together via a wiring 7.

The form of coupling between the teaching device 12, the first controller 8, the second controller 9, and the third controller 11 is a daisy chain. The teaching device 12 transmits an instruction signal to the first controller 8, the second controller 9, and the third controller 11.

The first controller 8 has a first connector 13 as a connector for coupling the wiring 7 electrically coupling to the teaching device 12. The first controller 8 has a second connector 14 as a connector for coupling the wiring 7 electrically coupling to a plurality of controllers, that is, the second controller 9 and the third controller 11. The first controller 8 has a third connector 15 for coupling the wiring 7 electrically coupled to the first robot arm 2.

The second controller 9 has a fourth connector 16 for coupling the wiring 7 electrically coupling to the teaching device 12. The wiring 7 coupled to the fourth connector 16 is electrically coupled to the teaching device 12 via the first controller 8. The second controller 9 has a fifth connector 17 for coupling the wiring 7 electrically coupling to the third controller 11. The second controller 9 has a sixth connector 18 for coupling the wiring 7 electrically coupled to the second robot arm 3.

The third controller 11 has a seventh connector 19 for coupling the wiring 7 electrically coupling to the teaching device 12. The wiring 7 coupled to the seventh connector 19 is electrically coupled to the teaching device 12 via the first controller 8 and the second controller 9. The third controller 11 has an eighth connector 21 for coupling the wiring 7 electrically coupled to the third robot arm 4.

Figure 2:
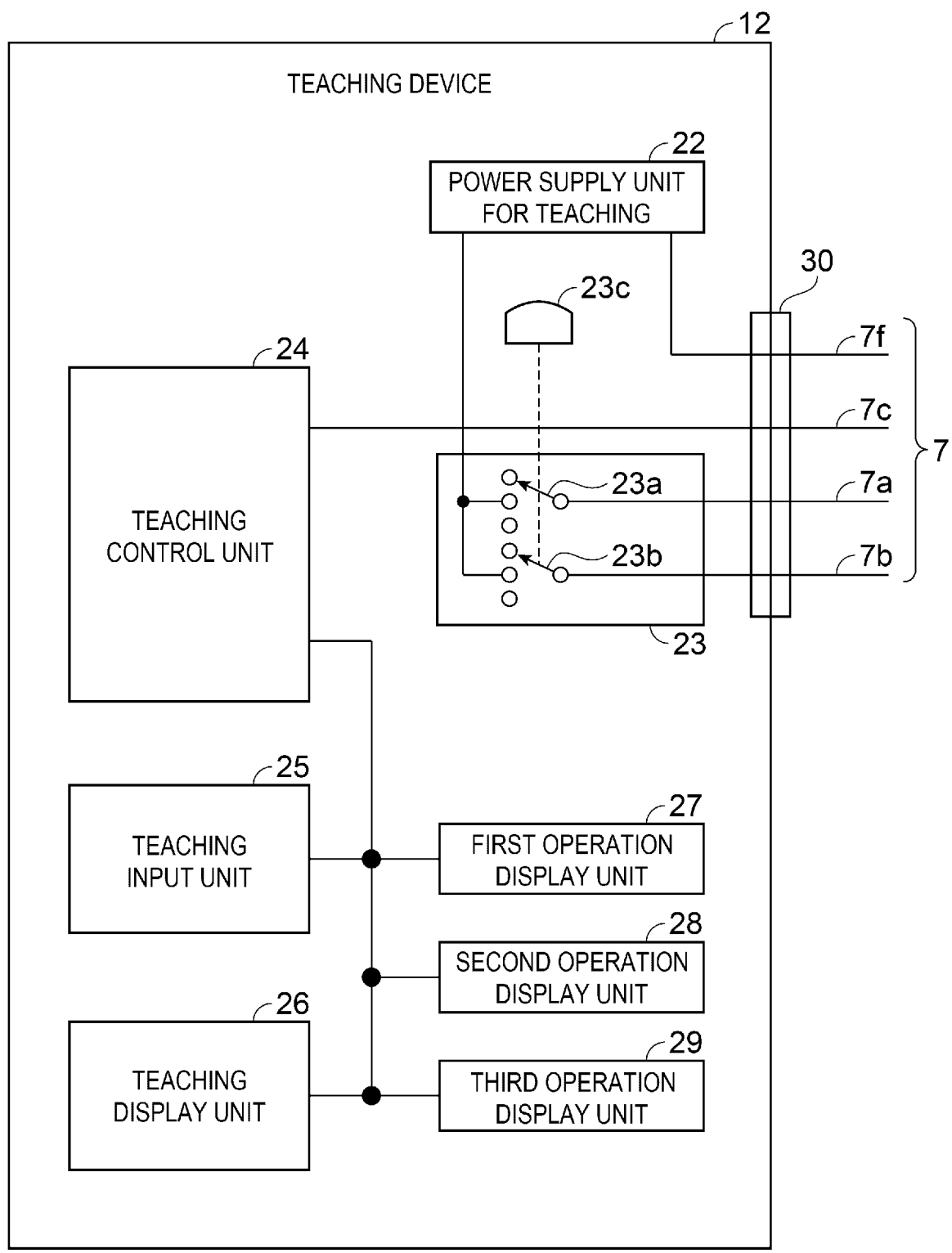
FIG. 2 is a block diagram showing the configuration of a teaching device.

In the circuit diagrams from FIG. 2 onward, when there is a dot at a point of intersection between wirings, the intersecting wirings are electrically coupled together. When there is no dot at a point of intersection between wirings, the wirings are not electrically coupled together. As shown in FIG. 2, the teaching device 12 has a power supply unit for teaching 22 and an enable switch 23. The enable switch 23 is an operation unit for selecting whether to enable the first to third robot arms 2 to 4 to operate or not. The power supply unit for teaching 22 supplies a predetermined voltage to the enable switch 23. The predetermined voltage is a voltage driving a photocoupler provided in the first to third controllers 8 to 11.

The enable switch 23 has a first switch 23a, a second switch 23b, and a press button 23c. The first switch 23a and the second switch 23b are linked to the press button 23c. Each of the first switch 23a and the second switch 23b has three contact points. A voltage is supplied to one of the three contact points from the power supply unit for teaching 22. A first wiring 7a is electrically coupled to the first switch 23a. A second wiring 7b is electrically coupled to the second switch 23b.

The teaching device 12 has a rod-like grip part. The operator grips the grip part to operate the teaching device 12. The press button 23c is installed at the grip part. When the operator grips the grip part with a gripping power to hold the teaching device 12, the press button 23c is pressed. When the operator releases the grip part, the press button 23c is not pressed.

When the operator does not press the press button 23c, the first switch 23a and the second switch 23b are turned off and the voltage from the power supply unit for teaching 22 is not applied to the first wiring 7a and the second wiring 7b. When the operator presses the press button 23c, the first switch 23a and the second switch 23b are turned on and therefore the voltage from the power supply unit for teaching 22 is applied to the first wiring 7a and the second wiring 7b. When the operator firmly presses the press button 23c, the first switch 23a and the second switch 23b are turned off and the voltage from the power supply unit for teaching 22 is not applied to the first wiring 7a and the second wiring 7b. When the switch is turned off, the circuit including the switch opens. When the switch is turned on, the circuit including the switch closes.

When the operator does not grip the grip part, the voltage from the power supply unit for teaching 22 is not applied to the first wiring 7a and the second wiring 7b. When the operator grips the grip part with a normal gripping power, the voltage from the power supply unit for teaching 22 is applied to the first wiring 7a and the second wiring 7b. When the operator firmly grips the grip part, the voltage from the power supply unit for teaching 22 is not applied to the first wiring 7a and the second wiring 7b.

The teaching device 12 also has a teaching control unit 24. A teaching input unit 25, a teaching display unit 26, a first operation display unit 27, a second operation display unit 28, and a third operation display unit 29 are electrically coupled to the teaching control unit 24. The wiring 7 includes a third wiring 7c in addition to the first wiring 7a and the second wiring 7b. The third wiring 7c electrically couples the teaching control unit 24 and the first controller 8 together. The wiring 7 also includes a ground-level sixth wiring 7f having a voltage of 0 volt.

The teaching input unit 25 is a touch key, a joystick, a press button or the like. The operator operates the teaching input unit 25 and thus designates an operation of the first to third robot arms 2 to 4.

The teaching display unit 26 is formed of a liquid crystal display device, a plasma display or the like. The teaching display unit 26 displays information inputted from the teaching input unit 25 or information representing the state of the first to third robot arms 2 to 4.

As the first operation display unit 27, the second operation display unit 28, and the third operation display unit 29, for example, an LED (light-emitting diode) that can display two colors such as red and blue is used. The first operation display unit 27 shows the operation state of the first robot arm 2. The second operation display unit 28 shows the operation state of the second robot arm 3. The third operation display unit 29 shows the operation state of the third robot arm 4. When the red LED is on, the corresponding robot arm is in operation. When the blue LED is on, the corresponding robot arm is stopped.

The first to third controllers 8 to 11 transmit setting information representing a setting about whether to operate the motor 5 or not, to the teaching control unit 24 of the teaching device 12. The teaching control unit 24 takes in the setting information representing the setting about whether to operate the motor 5 or not, and turns on the first to third operation display units 27 to 29 corresponding to the setting information. In the robot system 1, the first to third operation display units 27 to 29 of the teaching device 12 display the setting about whether to operate the motor 5 or not.

In this configuration, the teaching device 12 displays the setting about whether to operate the motor 5 or not. Therefore, the operator can view the teaching device 12 and check whether the motor 5 of the robot arm that is the operation target is operable or not.

The teaching device 12 has a ninth connector 30. The wiring 7 electrically couples the teaching device 12 and the first controller 8 together via the ninth connector 30.

Figure 3:
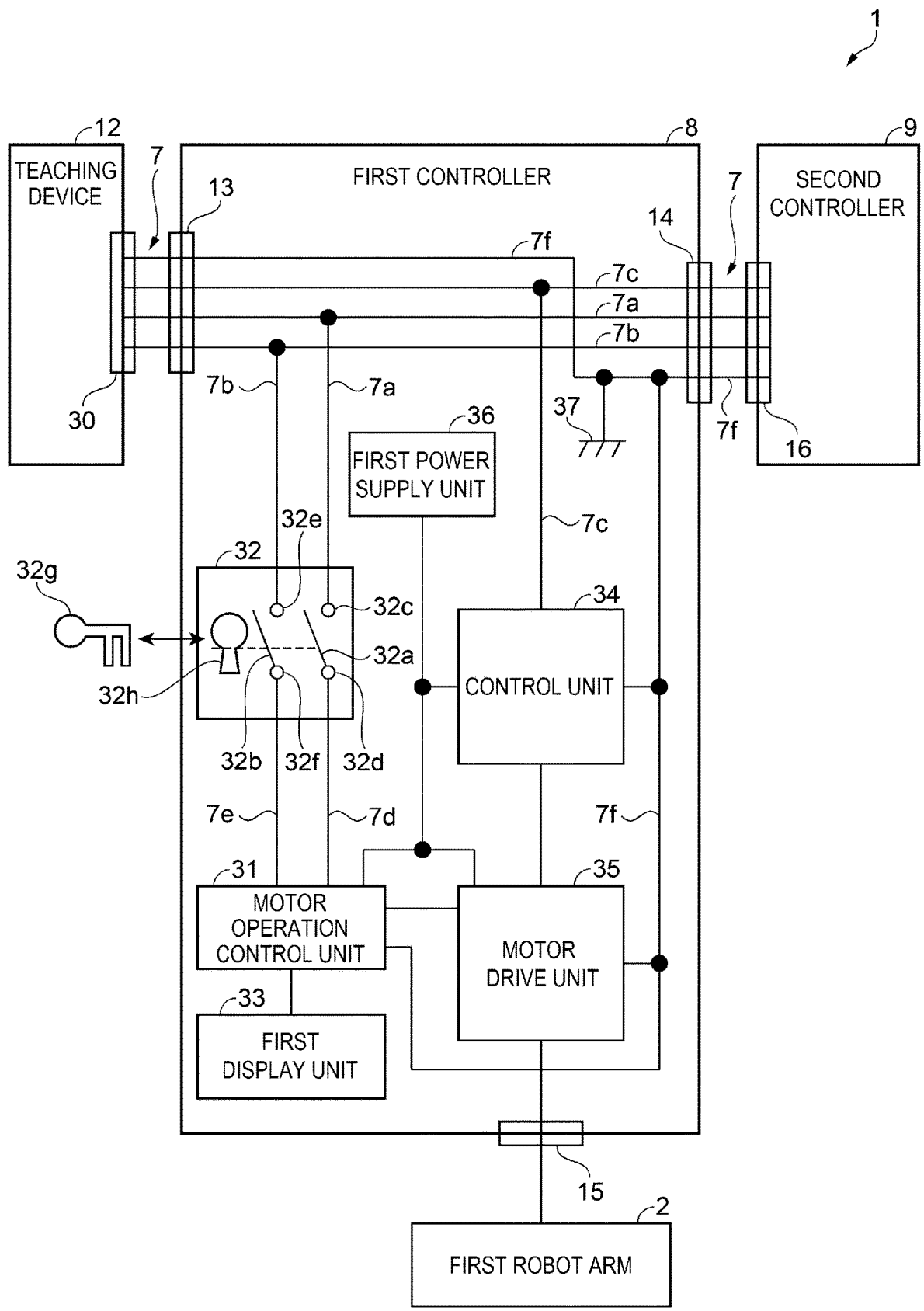
FIG. 3 is a block diagram showing the configuration of a first controller.

As shown in FIG. 3, the first controller 8 is electrically coupled to the teaching device 12 via the first wiring 7a, the second wiring 7b, the third wiring 7c, and the sixth wiring 7f of the wiring 7. The first wiring 7a, the second wiring 7b, the third wiring 7c, and the sixth wiring 7f are electrically coupled to the second controller 9.

The first controller 8 has a motor operation control unit 31 controlling whether to operate the motor 5 or not, and a first enable valid/invalid switch 32 as a switch unit for setting whether to operate the motor 5 or not.

The first enable valid/invalid switch 32 has a third switch 32a and a fourth switch 32b. The third switch 32a opens and closes a circuit between a first contact point 32c and a second contact point 32d. The fourth switch 32b opens and closes a circuit between a third contact point 32e and a fourth contact point 32f.

The first contact point 32c is electrically coupled to the first wiring 7a. The third contact point 32e is electrically coupled to the second wiring 7b. The second contact point 32d is electrically coupled to the motor operation control unit 31 via a fourth wiring 7d. The fourth contact point 32f is electrically coupled to the motor operation control unit 31 via a fifth wiring 7e.

The first enable valid/invalid switch 32 has a removable key 32g and a lock 32h. Locking or unlocking the lock 32h enables a setting about whether to operate the motor 5 or not. This configuration enables management of the operation of the first controller 8 by managing the key 32g. Similarly to the first controller 8, the second controller 9 and the third controller 11 have a first enable valid/invalid switch 32. Thus, the number of controllers to be operated and the operator operating the key 32g can be easily managed.

The number of keys 32g is not limited. Preparing a plurality of keys 32g enables a plurality of operators to simultaneously operate a plurality of first enable valid/invalid switches 32 and therefore can improve operability. The number of keys 32g may be one and the operator operating the key 32g may be limited to one operator. The robot system 1 can be managed strictly.

The third switch 32a and the fourth switch 32b are linked to the operation of the key 32g. When the operator locks the lock 32h using the key 32g, the third switch 32a and the fourth switch 32b are turned on. At this point, a predetermined voltage is applied to the motor operation control unit 31 from the power supply unit for teaching 22. When the operator unlocks the lock 32h using the key 32g, the third switch 32a and the fourth switch 32b are turned off. At this point, the predetermined voltage is not applied to the motor operation control unit 31.

When a predetermined voltage is applied to the motor operation control unit 31 via the fourth wiring 7d and a predetermined voltage is applied to the motor operation control unit 31 via the fifth wiring 7e, the motor 5 of the first robot arm 2 becomes operable. When the first wiring 7a or the second wiring 7b is disconnected, the motor 5 of the first robot arm 2 does not operate.

A first display unit 33 is electrically coupled to the motor operation control unit 31. Similarly to the first operation display unit 27, the first display unit 33 has a red LED and a blue LED. When the motor 5 of the first robot arm 2 is operable, the first display unit 33 turns on the red LED. When the motor 5 of the first robot arm 2 is not operated, the first display unit 33 turns on the blue LED. The operator views the first display unit 33 and checks whether the motor 5 of the first robot arm 2 is operable or not.

The first controller 8 has a control unit 34 controlling the operation of the robot arm. The control unit 34 is electrically coupled to the third wiring 7c. The control unit 34 communicates with the teaching control unit 24 via the third wiring 7c.

The first controller 8 has a motor drive unit 35 driving the motor 5 of the first robot arm 2. The motor drive unit 35 takes in a drive signal from the control unit 34 and drives the motor 5 of the first robot arm 2, based on the drive signal.

The first controller 8 has a first power supply unit 36. The first power supply unit 36 supplies electric power to the motor operation control unit 31, the control unit 34, and the motor drive unit 35.

The first controller 8 has a grounding unit 37. The grounding unit 37 is a chassis ground. The grounding unit 37 may be electrically coupled to a ground element embedded in the ground. The grounding unit 37 is electrically coupled to the teaching device 12, the motor operation control unit 31, the control unit 34, the motor drive unit 35, and the second controller 9 via the sixth wiring 7f.

The motor operation control unit 31 controls the operation of the motor 5, based on the setting at the first enable valid/invalid switch 32 about whether to operate the motor 5 or not, regardless of the instruction signal outputted from the teaching device 12 to the control unit 34.

In this configuration, regardless of the instruction from the teaching device 12, the motor 5 of the first robot arm 2 stops when the first enable valid/invalid switch 32 is set so as not to operate the motor 5. Thus, malfunctioning of the first robot arm 2 can be restrained even when the teaching device 12 has a failure or an operation error.

Figure 4:
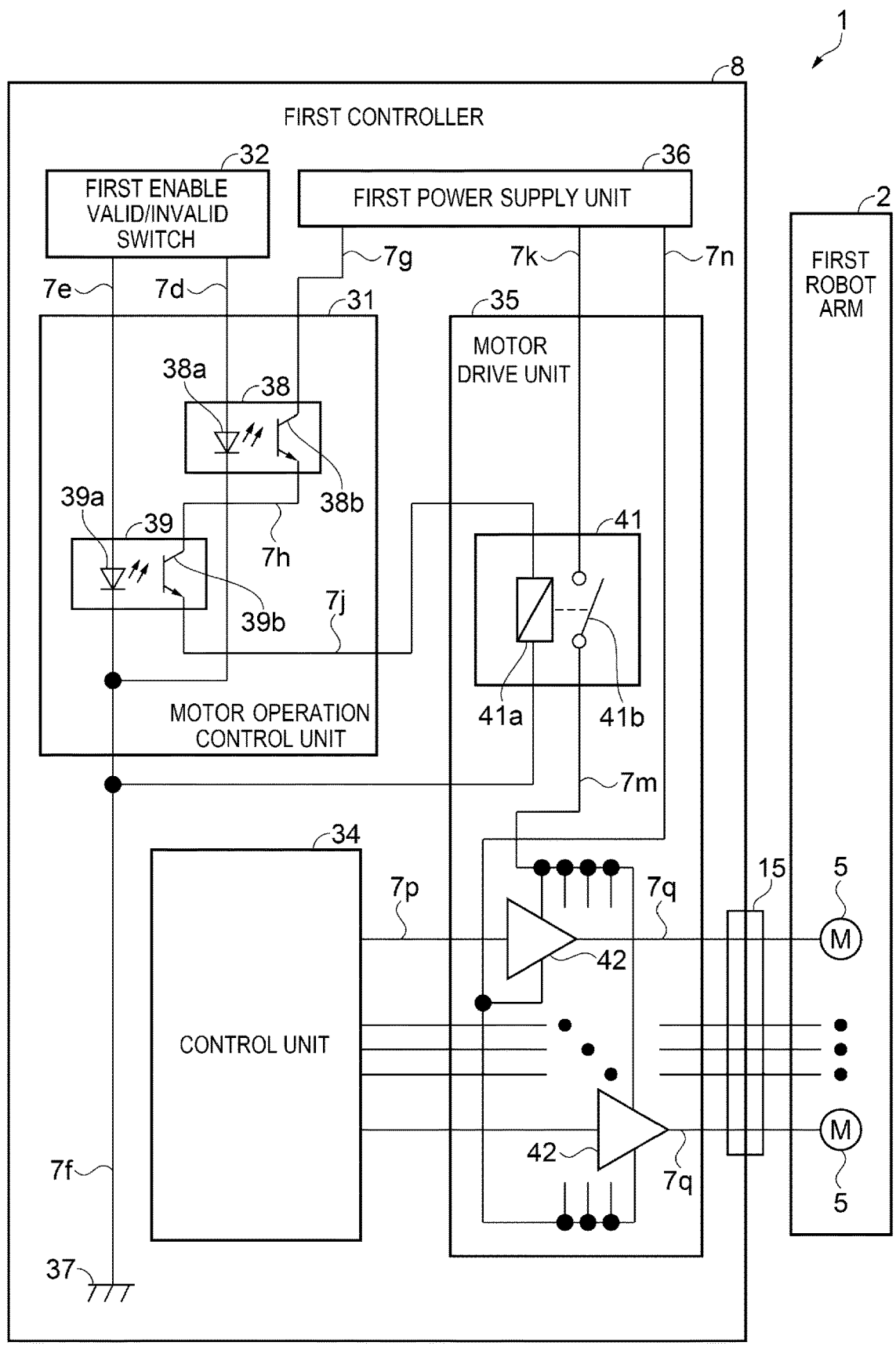
FIG. 4 is a block diagram showing the configuration of the first controller.

As shown in FIG. 4, the motor operation control unit 31 has a first photocoupler 38 and a second photocoupler 39. The first photocoupler 38 has a first light-emitting element 38a and a first phototransistor 38b. The fourth wiring 7d is electrically coupled to the anode of the first light-emitting element 38a. The sixth wiring 7f is electrically coupled to the cathode of the first light-emitting element 38a. The collector of the first phototransistor 38b and the first power supply unit 36 are electrically coupled together via a seventh wiring 7g.

The second photocoupler 39 has a second light-emitting element 39a and a second phototransistor 39b. The fifth wiring 7e is electrically coupled to the anode of the second light-emitting element 39a. The sixth wiring 7f is electrically coupled to the cathode of the second light-emitting element 39a. The collector of the second phototransistor 39b and the emitter of the first phototransistor 38b are electrically coupled together via an eighth wiring 7h. LEDs are used as the first light-emitting element 38a and the second light-emitting element 39a.

The motor drive unit 35 has a relay 41 and a plurality of inverters 42. The number of inverters 42 is the same as the number of motors 5 installed in the first robot arm 2. One inverter 42 drives one motor 5.

The relay 41 has an electromagnet 41a and a fifth switch 41b. The fifth switch 41b is linked to the electrification of the electromagnet 41a. The emitter of the second phototransistor 39b and one terminal of the electromagnet 41a are electrically coupled together via a ninth wiring 7j. The sixth wiring 7f is electrically coupled to the other terminal of the electromagnet 41a. One terminal of the fifth switch 41b is electrically coupled to the first power supply unit 36 via a tenth wiring 7k. The other terminal of the fifth switch 41b and the inverter 42 are electrically coupled together via an eleventh wiring 7m. A drive voltage supplied from the first power supply unit 36 is supplied to the inverter 42 via the eleventh wiring 7m. The drive voltage is a voltage driving the motor 5.

Each inverter 42 and the first power supply unit 36 are electrically coupled together via a twelfth wiring 7n. A control voltage is supplied to the inverter 42 via the twelfth wiring 7n. The control voltage is a voltage supplied for the inverter 42 to function.

Each inverter 42 and the control unit 34 are electrically coupled together via a thirteenth wiring 7p. A control signal is supplied to the inverter 42 via the thirteenth wiring 7p. Each inverter 42 and each motor 5 are electrically coupled together via a fourteenth wiring 7q. The inverter 42 outputs a drive current to the motor 5 via the fourteenth wiring 7q.

When a current is supplied to both the fourth wiring 7d and the fifth wiring 7e from the first enable valid/invalid switch 32, the first photocoupler 38 and the second photocoupler 39 are switched on and therefore the current flows through the electromagnet 41a of the relay 41. When the current flows through the electromagnet 41a, the fifth switch 41b is turned on and therefore the drive voltage is applied to the inverter 42.

When one of the first enable valid/invalid switch 32, the first photocoupler 38, the second photocoupler 39, and the relay 41 has a failure, the drive voltage is not supplied to the inverter 42. When one of the fourth wiring 7d, the fifth wiring 7e, the seventh wiring 7g, the eighth wiring 7h, and the ninth wiring 7j is disconnected, the drive voltage is not supplied to the inverter 42.

The eleventh wiring 7m is electrically coupled to the plurality of inverters 42. Therefore, the application of the drive voltage to the plurality of inverters 42 is controlled by the first enable valid/invalid switch 32.

As shown in FIG. 5, when both the enable switch 23 and the first enable valid/invalid switch 32 are valid, the operation state of the robot arm is the operable state. That the switch is valid means that the switch is on. That the switch is invalid means that the switch is off. When one of the enable switch 23 and the first enable valid/invalid switch 32 is invalid, the robot arm does not operate. When both the enable switch 23 and the first enable valid/invalid switch 32 are invalid, the robot arm does not operate.

As shown in FIG. 6, both the enable switch 23 and the first enable valid/invalid switch 32 need to be valid in order for the first robot arm 2 to be in the operable state.

A second enable valid/invalid switch equivalent to the first enable valid/invalid switch 32 is installed in the second controller 9. Both the enable switch 23 and the second enable valid/invalid switch need to be valid in order for the second robot arm 3 to be in the operable state.

A third enable valid/invalid switch equivalent to the first enable valid/invalid switch 32 is installed in the third controller 11. Both the enable switch 23 and the third enable valid/invalid switch need to be valid in order for the third robot arm 4 to be in the operable state.

Therefore, even when the teaching device 12 has a failure or an operation error, invalidating the first enable valid/invalid switch 32 can prevent the robot arm from malfunctioning.

In this embodiment, the first photocoupler 38 and the second photocoupler 39, which rarely have a failure, are used. Therefore, an operation error can be prevented more securely than when the robot arm is controlled to prevent an operation error by software.

Second Embodiment

This embodiment differs from the first embodiment in that the motor operation control unit 31 controls the control voltage instead of the drive voltage. The same components as in the first embodiment are denoted by the same reference signs and the description of these components is not repeated.

Figure 7:
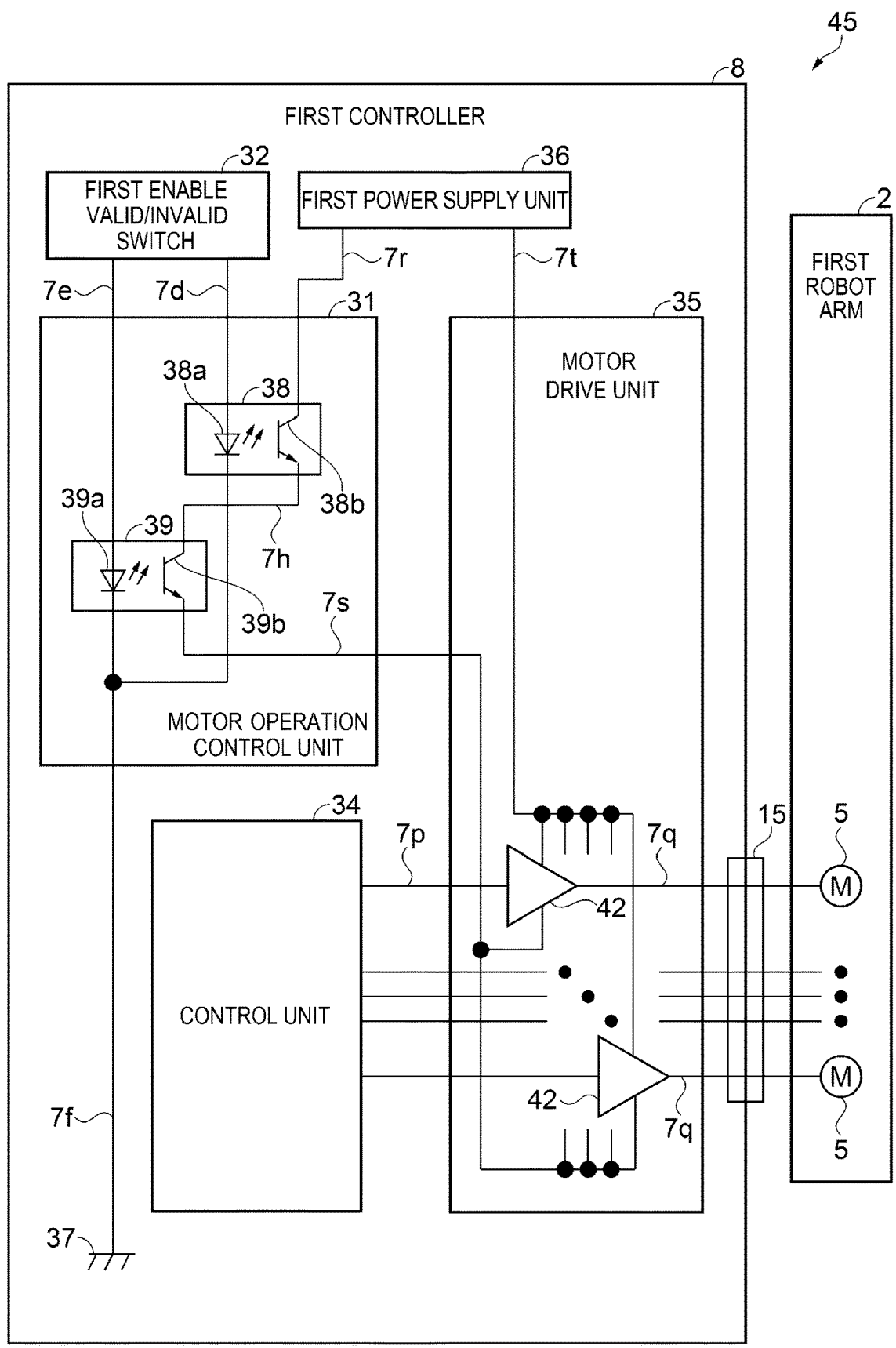
FIG. 7 is a block diagram showing the configuration of a first controller according to a second embodiment.

As shown in FIG. 7, in a robot system 45, the drive voltage from the first power supply unit 36 is supplied to the inverter 42 via a seventeenth wiring 7t.

The control voltage from the first power supply unit 36 is supplied to the first phototransistor 38b of the first photocoupler 38 via a fifteenth wiring 7r. The second phototransistor 39b of the second photocoupler 39 and each inverter 42 are electrically coupled together via a sixteenth wiring 7s. The control voltage from the first power supply unit 36 is supplied to the inverter 42 via the sixteenth wiring 7s.

When a current is supplied to both the fourth wiring 7d and the fifth wiring 7e from the first enable valid/invalid switch 32, the first photocoupler 38 and the second photocoupler 39 are switched on and therefore the control voltage is supplied to the inverter 42.

When the control voltage is supplied from the first power supply unit 36 to the inverter 42, the current flowing through the first photocoupler 38 and the second photocoupler 39 can be controlled at the first phototransistor 38b and the second phototransistor 39b.

In this configuration, as in the first embodiment, even when the teaching device 12 has a failure or an operation error, invalidating the first enable valid/invalid switch 32 can restrain the robot arm from malfunctioning. The current supplied to the inverter 42 by the control voltage is lower than the current supplied to the inverter 42 by the drive voltage and therefore can be controlled at the first photocoupler 38 and the second photocoupler 39. The first controller 8 does not use the relay 41 and therefore has fewer components.

Third Embodiment

This embodiment differs from the first embodiment in that the control unit 34 controls the operation state when a predetermined condition is met. The same components as in the first embodiment are denoted by the same reference signs and the description of these components is not repeated.

Figure 8:
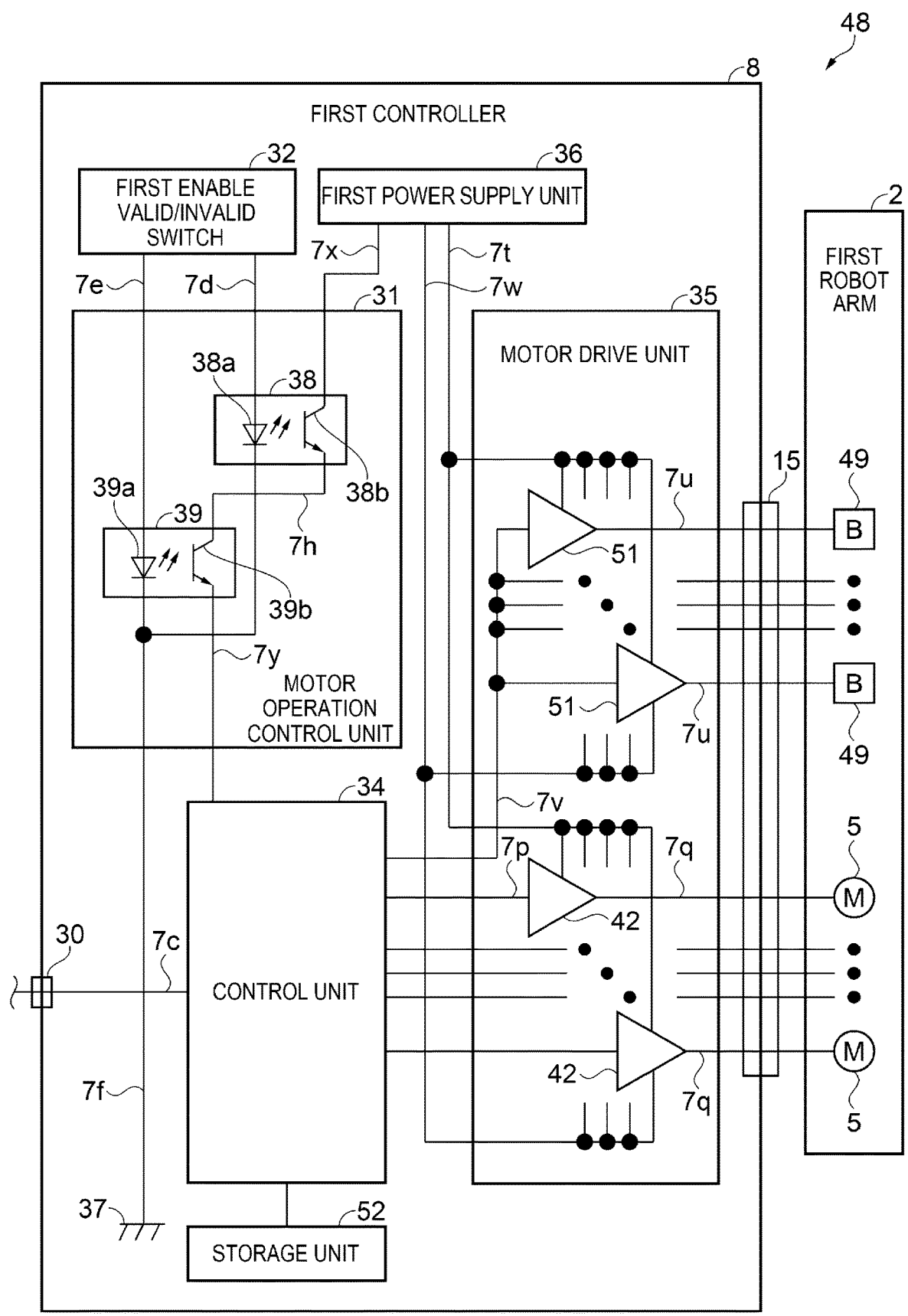
FIG. 8 is a block diagram showing the configuration of a first controller according to a third embodiment.

As shown in FIG. 8, in a robot system 48, the first robot arm 2 has a brake unit 49 corresponding to each motor 5. The brake unit 49 is equivalent to the brake 6 in the first embodiment. The brake unit 49 applies the brake to the shaft of each motor 5 and thus maintains the attitude of the first robot arm 2.

The motor drive unit 35 has a brake driver 51 driving each brake unit 49. Each brake driver 51 and each brake unit 49 are electrically coupled together via an eighteenth wiring 7u. The brake driver 51 outputs a drive signal to the brake unit 49 via the eighteenth wiring 7u. The control unit 34 and each brake driver 51 are electrically coupled together via a nineteenth wiring 7v. The control unit 34 outputs a control signal to the brake driver 51 via the nineteenth wiring 7v.

The drive voltage from the first power supply unit 36 is supplied to the inverter 42 and the brake driver 51 via the seventeenth wiring 7t. The control voltage from the first power supply unit 36 is supplied to each inverter 42 and each brake driver 51 via a twentieth wiring 7w.

A switch signal voltage from the first power supply unit 36 is supplied to the first phototransistor 38b of the first photocoupler 38 via a twenty-first wiring 7x. The second phototransistor 39b of the second photocoupler 39 and the control unit 34 are electrically coupled together via a twenty-second wiring 7y.

When a current is supplied to both the fourth wiring 7d and the fifth wiring 7e from the first enable valid/invalid switch 32, the first photocoupler 38 and the second photocoupler 39 are switched on. Therefore, the switch signal voltage is supplied to the control unit 34.

When the switch signal voltage is not inputted to the control unit 34 via the twenty-second wiring 7y, the control unit 34 outputs, to the brake driver 51, a control signal causing the brake unit 49 to apply the brake. The control unit 34 does not respond to the instruction signal inputted via the third wiring 7c and does not output a control signal for rotating the motor 5, to each inverter 42.

When the switch signal voltage is inputted to the control unit 34 via the twenty-second wiring 7y, the control unit 34 outputs a control signal for rotating the motor 5, to each inverter 42, in response to the instruction signal inputted via the third wiring 7c. The control unit 34 outputs, to the brake driver 51, a control signal for the brake unit 49 not to apply the brake.

In this configuration, as in the first embodiment, even when the teaching device 12 has a failure or an operation error, invalidating the first enable valid/invalid switch 32 can restrain the robot arm from malfunctioning.

The first controller 8 has a storage unit 52 storing a motor stop condition. The motor stop condition includes a criterion value for determining the duration of the time for which the absence of rotation of the motor 5 continues. The storage unit 52 and the control unit 34 are electrically coupled together. When the operation of the first robot arm 2 satisfies the motor stop condition, the control unit 34 stops the motor 5. The control unit 34 applies the brake to the motor 5 and thus maintains the attitude of the first robot arm 2.

In this configuration, when the motor stop condition is satisfied, the motor 5 is stopped and the brake is applied thereto. The first robot arm 2 maintains the attitude and therefore can be restrained from running out of control. The second robot arm 3 and the third robot arm 4 have the same configuration as the first robot arm 2. Therefore, the second robot arm 3 and the third robot arm 4 maintain the attitude and therefore can be restrained from running out of control.

Fourth Embodiment

This embodiment differs from the first embodiment in that the sixth wiring 7f electrically coupled to the grounding unit 37 and the first to third wirings 7a to 7c are coupled to different connectors. The same components as in the first embodiment are denoted by the same reference signs and the description of these components is not repeated.

Figure 9:
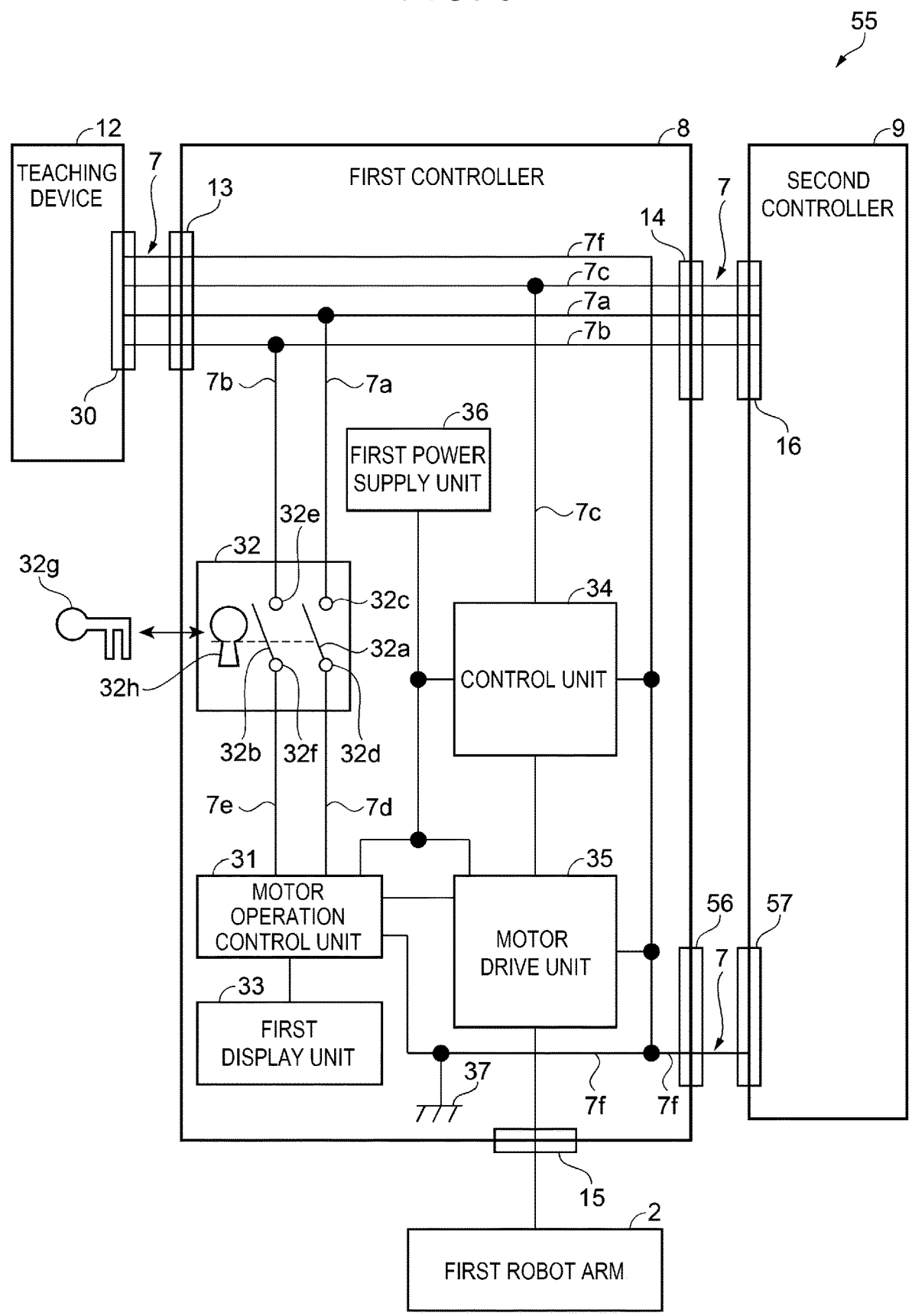
FIG. 9 is a block diagram showing the configuration of a fourth embodiment.

As shown in FIG. 9, in a robot system 55, the first controller 8 has a tenth connector 56 in addition to the first connector 13, the second connector 14, and the third connector 15. The first wiring 7a, the second wiring 7b, and the third wiring 7c are electrically coupled to the fourth connector 16 of the second controller 9 via the second connector 14.

The second controller 9 has an eleventh connector 57 in addition to the fourth connector 16. The sixth wiring 7f is electrically coupled to the eleventh connector 57 of the second controller 9 via the tenth connector 56. The first wiring 7a, the second wiring 7b, the third wiring 7c, and the sixth wiring 7f are electrically coupled to circuits inside the second controller 9.

In this configuration, as in the first embodiment, even when the teaching device 12 has a failure or an operation error, invalidating the first enable valid/invalid switch 32 can restrain the robot arm from malfunctioning.

Fifth Embodiment

In the first embodiment, the motor 5 is enabled to be driven when the voltage from the power supply unit for teaching 22 is applied to the first wiring 7a and the second wiring 7b. However, this is not limiting. A circuit configuration that enables the motor 5 to be driven when the voltage from the power supply unit for teaching 22 is not applied to the first wiring 7a and the second wiring 7b may be employed. In this configuration, as in the first embodiment, even when the teaching device 12 has a failure or an operation error, invalidating the first enable valid/invalid switch 32 can restrain the robot arm from malfunctioning.

Sixth Embodiment

In the first enable valid/invalid switch 32 in the first embodiment, the key 32g is inserted in the lock 32h to operate the controller. Also, a key in the form of matching numbers may be used for the first enable valid/invalid switch 32. Moreover, biometric authentication such as facial authentication or fingerprint authentication may be used for the first enable valid/invalid switch 32. Thus, the operator can operate the controller even when the key 32g is lost.

What is claimed is:

1. A robot system comprising:
a plurality of robot arms having a motor;
a plurality of controllers controlling the robot arms; and
a teaching device designating the controller and transmitting an instruction signal thereto, wherein
the controller includes:
a control unit controlling an operation of the robot arm;
a motor operation control unit controlling whether to operate the motor or not;
a connector for coupling a wiring electrically coupling to the teaching device; and
a switch unit setting whether to operate the motor or not,
the motor operation control unit controls the operation of the motor, based on the setting by the switch unit about whether to operate the motor or not, regardless of the instruction signal,
wherein the wiring comprises a first wiring, a second wiring and a third wiring; the controller is electrically connected to the teaching device via the first wiring, the second wiring and the third wiring; the switch unit is electrically connected to the first wiring and the second wiring; and the control unit communicates with the teaching device via the third wiring to receive the instruction signal so as to control the operation of the robot arms.

2. The robot system according to claim 1, wherein
the switch unit has a removable key and a lock, and
locking or unlocking the lock enables the setting about whether to operate the motor or not.

3. The robot system according to claim 1, wherein
the controller transmits setting information representing the setting about whether to operate the motor or not, to the teaching device, and
the teaching device displays the setting about whether to operate the motor or not.

4. The robot system according to claim 1, wherein
the controller has a storage unit storing a motor stop condition, and
when the operation of the robot arm satisfies the motor stop condition, the control unit stops the motor and applies a brake to the motor to maintain an attitude of the robot arm.

* * * * *